(12) United States Patent
Hsu

(10) Patent No.: US 7,528,883 B2
(45) Date of Patent: May 5, 2009

(54) METHOD FOR BLURRED IMAGE JUDGMENT

(75) Inventor: Wei Hsu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 484 days.

(21) Appl. No.: 11/456,047

(22) Filed: Jul. 6, 2006

(65) Prior Publication Data

US 2007/0252907 A1  Nov. 1, 2007

(30) Foreign Application Priority Data

May 8, 2006  (TW) .............................. 95116186 A

(51) Int. Cl.
*H04N 5/232* (2006.01)

(52) U.S. Cl. .................. 348/345; 348/353; 348/333.04; 382/255; 382/264

(58) Field of Classification Search ................ 348/345, 348/248, 208.4, 208.3, 346; 382/255, 264, 382/266
See application file for complete search history.

(56) References Cited

U.S. PATENT DOCUMENTS

| | | | |
|---|---|---|---|
| 6,252,997 B1 * | 6/2001 | Miura et al. ................ 382/261 |
| 6,812,969 B2 * | 11/2004 | Ide et al. ..................... 348/346 |
| 6,900,841 B1 * | 5/2005 | Mihara ....................... 348/345 |
| 7,176,975 B2 * | 2/2007 | Matsunaga et al. .......... 348/345 |
| 7,286,168 B2 * | 10/2007 | Yamasaki .................... 348/239 |
| 2006/0098970 A1 * | 5/2006 | Sato ........................... 396/121 |
| 2006/0210265 A1 * | 9/2006 | Adachi ........................ 396/374 |

* cited by examiner

*Primary Examiner*—Ngoc-Yen T Vu
*Assistant Examiner*—Gary C Vieaux
(74) *Attorney, Agent, or Firm*—Apex Juris, PLLC; Tracy M Heims

(57) ABSTRACT

A method for blurred image judgment is provided. Firstly, a focus value FV1 of an original image is calculated. By using a blur function, the original image is obfuscated to generate a blurred image, and then the focus value FV2 of the blurred image is calculated. A blur ratio FV1/FV2 is compared with a blur threshold value Tp, thereby discriminating whether the original image is blurred according to the comparing result. The method for blurred image judgment is applicable to a digital image capture device. If the original image is deemed blurred, a blur image signal is issued to notify the user whether the retaking operation is done.

8 Claims, 2 Drawing Sheets

METHOD FOR BLURRED IMAGE JUDGMENT

FIELD OF THE INVENTION

The present invention relates to a method for blurred image judgment, and more particularly to a method for discriminating whether an image captured by a digital image capture device is blurred or sharp.

BACKGROUND OF THE INVENTION

Currently, digital image capture devices such as digital cameras and camera phones are widely used to take photographs. Referring to FIG. 1, a schematic block diagram of a conventional digital image capture device is illustrated. The digital image capture device 100 comprises an image signal generator 110 and a display screen 120. When an activating button is clicked to take a photograph, the image of an object is generated by the image signal generator 110 and transmitted to the display screen 120 for display.

As known, there are two approaches to evaluate whether the images are sharp or not.

In accordance with the first approach, the image of the object taken by the digital image capture device 100 is immediately shown on the display screen 120 such as a liquid crystal display (LCD). By successively scaling up and shifting the image, the user may visually discriminate whether the image is sharp. If the image is blurred, the use may retake the photograph as desired. This approach, however, is time-consuming and consumes much power.

In accordance with the second approach, the image of the object taken by the digital image capture device 100 is transmitted to a computer and shown on a monitor (not shown). Likewise, the user may visually examine the image shown on the monitor to discriminate whether the image is sharp. Since the computer's monitor is much larger than the display screen 120 of the digital image capture device 100, the procedure of successively scaling up and shifting the image may be exempted. Unfortunately, if the image is considered as a blurred image at this time, the chance of retaking the photograph is lost. As a consequence, the first approach is acceptable for most users.

Recently, some digital image capture devices have built-in anti-shake video compensation systems to implement quality automatic retouching and enhancement so as to retouch and enhance the quality of the image. The digital image capture device with the capability of quality automatic retouching and enhancement is more expensive than that without the quality automatic retouching and enhancement. In views of cost-effectiveness, the anti-shake video compensation systems are not suitable to some kinds of digital image capture devices such as camera phones.

In views of the above-described disadvantages of the prior art, the applicant keeps on carving unflaggingly to develop a method for blurred image judgment according to the present invention through wholehearted experience and research.

SUMMARY OF THE INVENTION

It is an object of the present invention to provide a method for discriminating whether an image captured by a digital image capture device is blurred or sharp.

In accordance with an aspect of the present invention, there is provided a method for blurred image judgment. Firstly, a blur threshold value Tp is provided. Then, a focus value FV1 of an original image is calculated. The original image is obfuscated by using a blur function, thereby generating a blurred image, and calculating a focus value FV2 of the blurred image. After a blur ratio FV1/FV2 is compared with the blur threshold value Tp, it is discriminated whether the original image is blurred according to the comparing result.

Preferably, the blur threshold value Tp is ranged between 1.1 and 1.3.

In an embodiment, the blur function is a Gaussian filter's function.

In an embodiment, the blur function is a low-pass filter's function.

In an embodiment, the original image is deemed sharp when the blur ratio FV1/FV2 is greater than or equal to the blur threshold value Tp, and the original image is deemed blurred when the blur ratio FV1/FV2 is less than the blur threshold value Tp.

In accordance with another aspect of the present invention, there is provided a digital image capture device for generating an image signal of an object. The digital image capture device comprises an image signal generator and an image judging module. The image signal generator is used for generating the image signal of the object. The image judging module is used for discriminating whether the image signal is blurred.

In an embodiment, the image judging module discriminates whether the image signal is blurred according to the steps of: calculating a focus value FV1 of the image signal; obfuscating the image signal by using a blur function, thereby generating a blurred image, and calculating a focus value FV2 of the blurred image; comparing a blur ratio FV1/FV2 with a blur threshold value Tp; and discriminating whether the image signal is blurred according to the comparing result.

In an embodiment, the image signal is deemed sharp when the blur ratio FV1/FV2 is greater than or equal to the blur threshold value Tp, and the image signal is deemed blurred when the blur ratio FV1/FV2 is less than the blur threshold value Tp.

In an embodiment, the digital image capture device further comprises a display screen, and a blur image signal is shown on the display screen when the image signal is deemed blurred.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
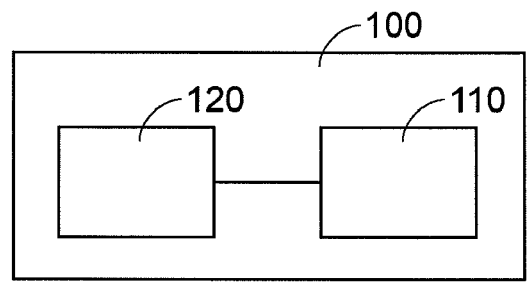
FIG. 1 is a schematic block diagram of a conventional digital image capture device.
Figure 2:
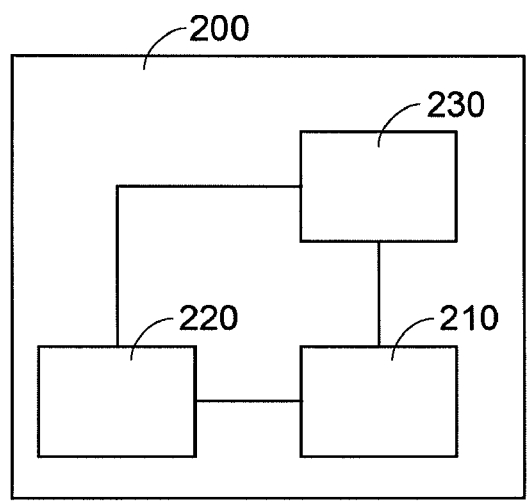
FIG. 2 is a schematic block diagram of a digital image capture device according to a preferred embodiment of the present invention.

Referring to FIG. 2, a schematic block diagram of a digital image capture device according to a preferred embodiment of the present invention is illustrated. The digital image capture device 200 comprises an image signal generator 210, a display screen 220 and an image judging module 230. When a photograph of an object is taken by the digital image capture device 200, the image signal generator 210 issues an image signal to the display screen 220 for display. The image signal is also transmitted to the image judging module 230 to discriminate whether the image is blurred. If the image of the object is deemed as a blurred image, a blur image signal is issued from the image judging module 230. In response to the blur image signal, the digital image capture device 200 will automatically retake the photograph. Alternatively, the blur image signal will be transmitted to the display screen 220. In response to the blur image signal shown on the display screen 220, the user may decide whether the photograph needs to be retaken or not.

According to the major feature of the present invention, the digital image capture device 200 has an image judging module 230 for discriminating whether the image is blurred. The operation principles of using the image judging module 230 to discriminate whether the image is blurred will be illustrated as follows.

Figure 3:
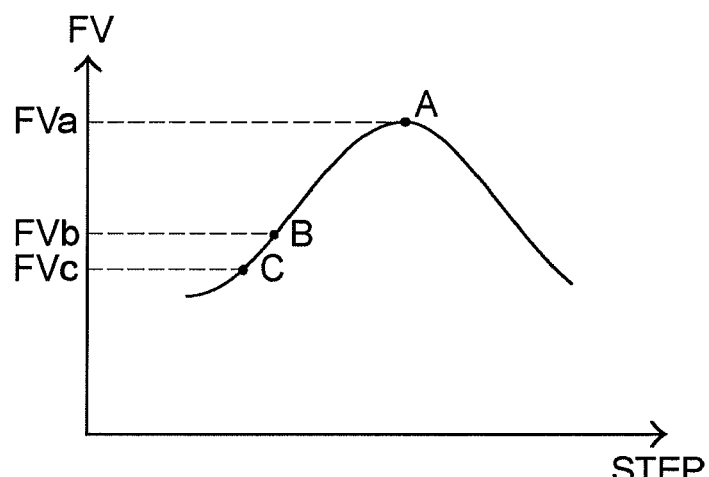
FIG. 3 is a typical curve plot illustrating the relation between lens search steps versus focus values.

First of all, a conventional method of discriminating whether the image is blurred or shape will be described with reference to FIG. 3. FIG. 3 is a typical curve plot illustrating the relation between lens search steps versus focus values (FVs). In FIG. 3, the vertical axle indicates the moving steps of the lens, and the horizontal axle indicates the corresponding focus values. According to a certain search algorithm, the position with the maximum focus value will be determined. In other words, a relatively sharp image is obtained when the focus value is near the apex of the curve; and a relatively blurred image is obtained when the focus value is far from the apex of the curve. As shown in FIG. 3, the focus values corresponding to the positions A, B and C are FVa, FVb and FVc, respectively. Since the focus value FVa is close to the apex, a shape image is obtained. In contrast, the images corresponding to the positions B and C are deemed as blurred images.

As described above, the focus values FVa, FVb and FVc corresponding to the positions A, B and C of the curve indicate a sharp image, a blurred image and a more blurred image, respectively. In a case that the sharp image having the focus value FVa is obfuscated, the focus value is reduced to for example FVb, so that the ratio of FVa to FVb is D1, i.e. FVa/FVb=D1. Whereas, in another case that the blurred image having the focus value FVb is obfuscated and the focus value is reduced to for example FVc, the ratio of FVb to FVc is D2, i.e. FVb/FVc=D2. Since the focus value FVa is much larger than the focuses FVb and FVc and the focus value FVb is slightly larger than FVc, it is found that D1 is greater than D2. In other words, if the image is originally sharp, a change between the original focus value and the obfuscated focus value is considerable. In contrast, if the image is originally blurred, a slight change between the original focus value and the obfuscated focus value is rendered.

Figure 4:
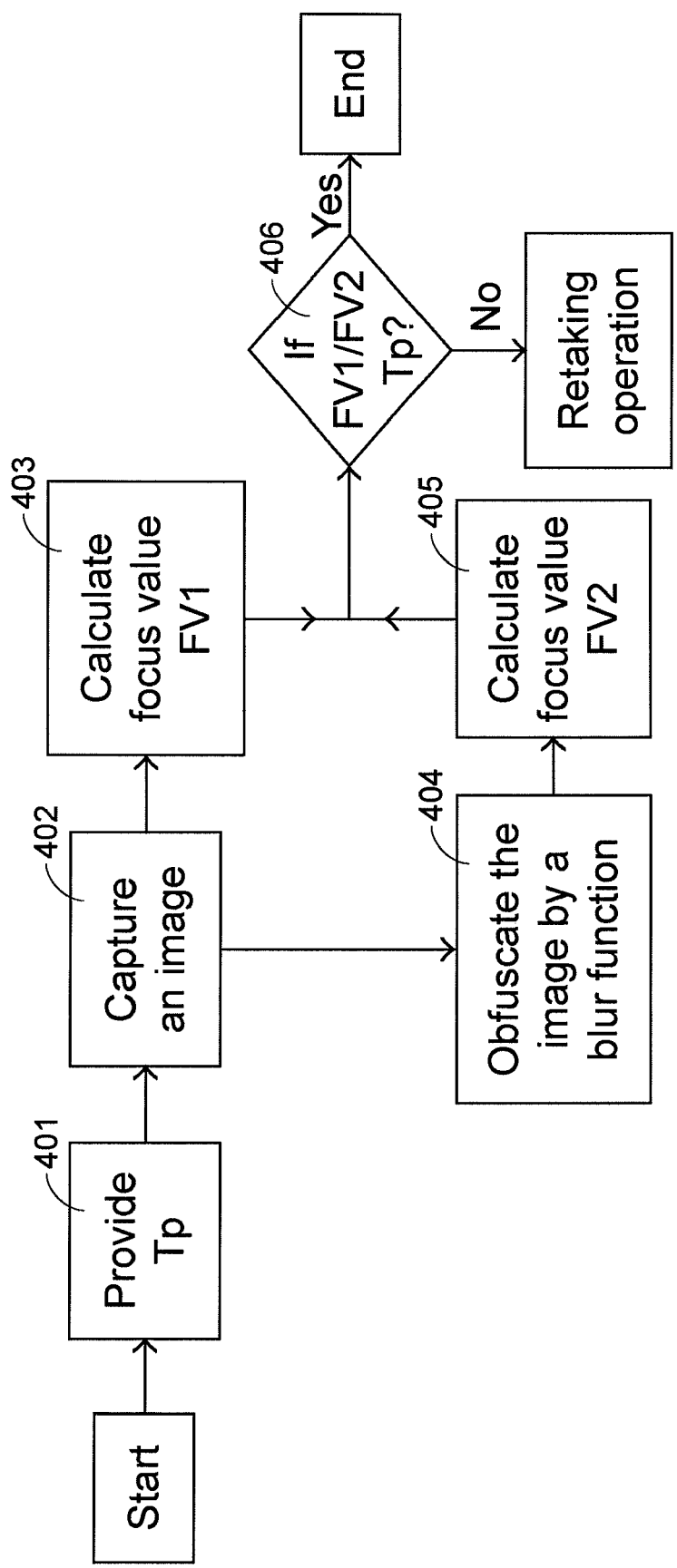
FIG. 4 is a flowchart illustrating the method for blurred image judgment according to the present invention.

Hereinafter, an embodiment for discriminating whether the image is blurred or shape by the image judging module 230 will be illustrated with reference to FIG. 4.

Firstly, a blur threshold value Tp is obtained according to preliminary experiments (Step 401). In an embodiment, the blur threshold value Tp is ranged between 1.1 and 1.3. Depending on the imaging characteristics, the sharpness function and the blur function of the digital image capture device, the blur threshold value Tp is varied. Then, a photograph of an object is taken to obtain an image (Step 402). Then, a focus value FV1 of the image is calculated by using a sharpness function (Step 403). The image is obfuscated by using a blur function such as a Gaussian filter's function or a low-pass filter's function, thereby generating a blurred image (Step 404). After the focus value FV2 of the blurred image is measured (Step 405), the ratio of FV1 to FV2 is calculated and compared with the blur threshold value Tp. If FV1/FV2 is greater than or equal to the blur threshold value Tp, the original image is deemed as a sharp image. Otherwise, if FV1/FV2 is less than the blur threshold value Tp, the original image is deemed as a blurred image and a blur image signal is issued. In response to blur image signal, the photograph of the object will be retaken manually or automatically.

As described above, if the image is originally sharp, a change between the original focus value and the obfuscated focus value is considerable. In contrast, if the image is originally blurred, a slight change between the original focus value and the obfuscated focus value is rendered. On account of these principles, if the image is originally sharp, the ratio of the original focus value to the obfuscated focus value may be greater than or equal to the blur threshold value Tp. Whereas, if the image is originally blurred, the ratio of the original focus value to the obfuscated focus value may be less than the blur threshold value Tp.

From the above description, the digital image capture device of the present invention is capable of discriminating whether the image of the object taken by the digital image capture device is blurred or sharp, thereby resulting a discriminating result. In comparison with the conventional procedure of successively scaling up and shifting the image to visually discriminate the image, the method of the present invention can quickly discriminate whether the image is blurred and thus the power consumption is reduced. In addition, since the method of the present invention utilizes the focuses values to discriminate the image, the discriminating result of the present method is more precise than the visual discrimination.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for blurred image judgment of an original image produced by a digital image capture device, comprising steps of:
   providing a blur threshold value Tp;
   calculating a focus value FV1 of the original image;
   obfuscating said original image by using a blur function, thereby generating a blurred image, and calculating a focus value FV2 of said blurred image;
   comparing a blur ratio FV1/FV2 with said blur threshold value Tp; and
   discriminating whether said original image is blurred according to the comparing result.

2. The method for blurred image judgment according to claim 1 wherein said blur threshold value Tp is ranged between 1.1 and 1.3.

3. The method for blurred image judgment according to claim 1 wherein said blur function is a Gaussian filter's function.

4. The method for blurred image judgment according to claim 1 wherein said blur function is a low-pass filter's function.

5. The method for blurred image judgment according to claim 1 wherein said original image is deemed sharp when said blur ratio FV1/FV2 is greater than or equal to said blur threshold value Tp, and said original image is deemed blurred when said blur ratio FV1/FV2 is less than said blur threshold value Tp.

6. A digital image capture device for generating an image signal of an object, said digital image capture device comprising:
- an image signal generator for generating said image signal of said object; and
- an image judging module for discriminating whether said image signal is blurred;
- wherein said image judging module discriminates whether said image signal is blurred according to the steps of:
- calculating a focus value FV1 of said image signal;
- obfuscating said image signal by using a blur function, thereby generating a blurred image, and calculating a focus value FV2 of said blurred image;
- comparing a blur ratio FV1/FV2 with a blur threshold value Tp; and discriminating whether said image signal is blurred according to the comparing result.

7. The digital image capture device according to claim 6 wherein said image signal is deemed sharp when said blur ratio FV1/FV2 is greater than or equal to said blur threshold value Tp, and said image signal is deemed blurred when said blur ratio FV1/FV2 is less than said blur threshold value Tp.

8. The digital image capture device according to claim 6 wherein said digital image capture device further comprises a display screen, and a blur image signal is shown on said display screen when said image signal is deemed blurred.

* * * * *